Patented Oct. 28, 1941

2,260,391

UNITED STATES PATENT OFFICE 2,260,391

CYCLIC PROCESS FOR PRODUCTION OF ANHYDRIDES OF CARBOXYLIC ACIDS

Aylmer H. Maude and Sidney G. Osborne, Niagara Falls, N. Y., assignors to Hooker Electrochemical Company, New York, N. Y., a corporation of New York No Drawing. Application June 30, 1939,
Serial No. 282,148

13 Claims. (Cl. 260—548)

The production of anhydrides from carboxylic acids involves extraction of a molecule of water from two of the acid which must of course be anhydrous. Anhydrous carboxylic acids, whether produced by synthesis or by dehydration of the aqueous natural acid, are expensive. The anhydride has hitherto, in general, been produced either from the acid, by pyrolysis, with much expenditure of heat energy, or from its salts, with much waste of reagents. The object of our invention is to provide a process which shall be of wider applicability and more economically sound than any hitherto known. In the pursuance of this objective, we start with the dilute natural or synthetic acid, avoid pyrolysis and eliminate waste by recycling all the principal by-products.

At present the most important of the anhydrides is perhaps that of acetic acid, as cellulose acetate is produced by reaction of cellulose with acetic anhydride. In this reaction water is extracted from the cellulose. This combines with acetic anhydride, converting it to acetic acid. In the washing of the product, this acetic acid becomes greatly diluted. It is an economic necessity that this dilute acetic acid be recycled in the process. For this purpose it must of course at some stage be freed from the water. The concentration of acetic acid is difficult and expensive. It is one of the objects of our invention to provide a practicable process by which acetic anhydride can be economically produced from the dilute acetic acid of the cellulose acetate process without the necessity for first concentrating it, by making up a stable salt from the dilute acid and then dehydrating the salt.

Acetic anhydride may be produced from acetylene, by synthesis, or from acetic acid, either directly, as by pyrolysis, or through its salts, by various reactions. In the latter case, the acetate may be reacted with sulphur chloride, sulphur trioxide, a chlorsulphonate or a pyrosulphate (the two latter of which reagents may be regarded as carriers of $SO_3$).

The process which produces acetic anhydride from acetylene is of course inapplicable to the recycling of acetic acid recovered from the cellulose acetate process.

The pyrolytic process for making acetic anhydride directly from acetic acid, if used in connection with the cellulose acetate process, involves first concentrating the dilute acid of that process, which it is one of the objects of our invention to avoid. The pyrolytic process is also technically difficult, involves a high initial investment and is extravagant of heat energy.

The processes in which an acetate is reacted with sulphur chloride, sulphur trioxide, a chlorsulphonate or a pyrosulphate, as at present operated or proposed, are extravagant of reagents, as they result in large production of waste by-products carrying out of the process sodium, sulphur and chlorine, which may have been purchased in the form of sodium chloride, sodium carbonate, elemental sulphur, sulphuric acid, sulphur chloride or elemental chlorine and therefore represent substantial values.

In Dreyfus Patents Nos. 1,283,115 and 1,338,979 there is disclosed a process for reacting an acetate with sulphur trioxide. This reaction cannot, however, be carried out at ordinary temperatures because under such conditions the sulphur trioxide decomposes the acetic anhydride produced. The reaction must therefore be carried out, according to the patents, "below 5° C." As a matter of fact, it is preferably carried out at —40° C. This is below the freezing point of $SO_3$, which must therefore be used in gaseous form, diluted with air. The air carries off some of the product. On this account and because of secondary reactions, the yield is never better than 80 per cent. Moreover, the sulphate and chloride formed are waste products.

In Dreyfus Patents Nos. 1,283,115 and 1,368,789 there is disclosed a process for reacting "dry" sodium or calcium acetate with sodium chlorsulphonate to produce acetic anhydride, sodium or calcium sulphate and sodium chloride, the latter of which are waste products. The calcium acetate reaction of the disclosure should, however, be disregarded, as calcium acetate cannot be dehydrated by ordinary methods without decomposition to calcium carbonate and acetone. In the alternative reaction the sodium sulphate and chloride formed as the by-products are both water soluble. Their separation is consequently difficult. That this is an important objection will be shown later.

Our process is of the general type of that in which an acetate is reacted with a chlorsulphonate, but differs from the prior art in that, for reasons that will hereinafter appear, we prefer to use an acetate which has not been hitherto proposed for this reaction, e. g., barium acetate. This acetate is more readily dehydratable than the sodium acetate of the prior art. Thus, sodium acetate requires to be dehydrated under vacuum at 100° C. Since it fuses at this temperature, this process involves stirring a viscous, plastic mass and consumes much power. Barium acetate, on the other hand can be dehydrated in granular form in a retort dryer at any temperature between 42° and 200° C., without vacuum. Moreover, barium sulphate is highly insoluble, therefore easily separated from sodium chloride. It is also readily convertible to barium sulphide or oxide, which readily react with dilute acetic acid. As will be shown later, this combination of properties lends itself to the development of a cyclic process, which is one of the objects of our invention.

Our principal reaction is therefore as follows:

$$Ba(CH_3CO_2)_2 + NaSO_3Cl = (CH_3CO)_2O + BaSO_4 + NaCl \quad (1)$$

In this reaction, as in those of the prior art, the acetate must, for obvious reasons, be anhydrous. The chlorsulphonate is of course necessarily so.

As both reagents are solid at ordinary temperatures, it is impractical to carry out this reaction without the use of a liquid medium. The preferred medium would of course be a solvent, and one which did not afterward have to be removed from the product. Fortunately, barium acetate is slightly soluble in glacial acetic acid. When the product is to be used in the cellulose acetate process, the presence of glacial acetic acid is not objectionable or uneconomical since the reaction of that process involves the acid as well as the anhydride. Hence, for this and other reasons to be given later, our process is preferably started by making up a paste of the reagents by means of glacial acetic acid. It is not necessary that the reagents be completely in solution at the start of the reaction, as the reagents initially in solution are constantly replenished by fresh reagents as the reaction proceeds.

The reaction will also take place in the absence of glacial acetic acid if acetic anhydride be present, as of course it is as soon as the reaction has been initiated. In this case the anhydride is believed to react with the chlorsulphonate, forming intermediate products, which eventually go over to the anhydride.

The reaction is exothermic and starts at room temperature. Good mixing is essential. This can be accomplished by using a reactor provided with a stirrer or mixer.

The reagents may be in equi-molecular proportions, or there may be an excess of chlorsulphonate or barium acetate. In the former case, if acetic anhydride is the only medium used, the reaction does not go to completion but acetic radical and $SO_3$ acidity are found in the residue. If there is a large excess of chlorsulphonate, the reaction will go to completion so far as the acetate is concerned, but acetyl chloride and sodium sulphate are formed. If, on the other hand, glacial acetic acid is present in the medium, the reagents may be in equi-molecular proportions and the reaction will go to 98 per cent of completion in about four hours at room temperature, ordinarily without the necessity for heating or cooling. For this and other reasons already given, the addition of glacial acetic acid at the start of the reaction is our preferred practice.

Upon completion of Reaction 1 the acetic anhydride and acetic acid are distilled from the reaction products, under vacuum, within a temperature range finishing at 200° C. The product is preferably condensed by refrigeration. The crude product contains 0.006 per cent sulphur, which may be reduced to a trace by fractionation. Any acetate remaining in the residue may be recovered by treatment with superheated steam at 200° C. Any acetate thus recovered must of course be dehydrated before reuse. The overall yield of the process as above outlined is better than 95 per cent of the theoretical yield.

Our process also differs from that of the prior art in that it includes steps subsequent to the principal reaction by which the barium sulphate of Equation 1 is reconverted to barium acetate according to the following equations:

$$BaSO_4 + 2C + heat = BaS + 2CO_2 \quad (2)$$
$$2CH_3COOH + BaS = Ba(CH_3CO_2)_2 + H_2S \quad (3)$$

The $H_2S$ of Equation 3 is then oxidized to $SO_3$ and $H_2O$ in accordance with the following equations:

$$H_2S + 3O = SO_2 + H_2O \quad (4)$$
$$SO_2 + O = SO_3 \quad (5)$$

Reactions 4 and 5 are started by ignition, after which, being exothermic, they are self-sustaining. Enough oxygen is used to completely oxidize the $H_2S$ to $SO_3$, with a slight excess. The $SO_2$ of Equation 4 is of course wet and must be dehydrated. The oxygen used in Equation 5 must likewise be anhydrous. This results in production of $SO_3$, which is necessarily anhydrous, as it cannot exist as such in contact with water. The NaCl of Equation 1 is separated from the $BaSO_4$ by simply dissolving it out as with water. The NaCl solution is then evaporated to dryness. The $SO_3$ of Equation 5 and the NaCl of Equation 1 are then reacted together to form $NaSO_3Cl$ in accordance with the following equation:

$$SO_3 + NaCl = NaSO_3Cl \quad (6)$$

The oxygen of Equations 4 and 5 is supplied as air.

As an alternative to Equations 2 and 3 the following reactions may be employed to accomplish the same result:

$$BaSO_4 + \tfrac{1}{2}C + heat = BaO + SO_2 + \tfrac{1}{2}CO_2 \quad (7)$$
$$2CH_3COOH + BaO = Ba(CH_3CO_2)_2 + H_2O \quad (8)$$

Equations 2 and 7 involve consumption of fuel. It may be considered that in these equations carbon has been used partly as fuel and partly as a reagent, but in Equation 7 a larger proportion has been used as fuel. Although Equations 7 and 8 may appear simpler than Equations 2 to 4, the latter reactions are preferred as the temperatures involved are lower.

The acetic acid of Equations 3 and 8 may of course be ordinary commercial acetic acid or the dilute acid of the cellulose acetate process above referred to. In that case the barium acetate of Equation 3, and in any case the barium acetate of Equation 8, must obviously be dehydrated. As already stated, this is easily effected, as this salt is quite stable and can withstand dehydrating temperature without decomposition.

The barium acetate of Equations 3 or 8 and the sodium chlorsulphonate of Equation 6 are of course recycled for the next batch.

*Example I*

1,000 lbs. of 20 per cent acetic acid were neutralized with 315 lbs. of 90 per cent barium sulphide and the solution boiled to expel all $H_2S$. The $H_2S$ was passed to a contact sulphuric acid plant and converted to 126 lbs. of $SO_3$ and this quantity was made up to 133 lbs. by $SO_3$ derived from combustion of sulphur in the same contact sulphuric acid plant. The barium acetate solution was evaporated by boiling and the residual acetate dried at 160° C. The $SO_3$ from the contact sulphuric acid plant was absorbed in 107 lbs. of dry salt in a rotary water-cooled reactor. The resulting sodium chlorsulphonate was transferred to a mixing machine and there was added to it the dry barium acetate and 323 lbs. of anhydrous acetic acid. The materials were mixed for six hours with cooling. From the resulting mass were distilled off 310 lbs. of acetic acid and 153 lbs. of acetic anhydride. This quantity of acetic anhydride represents a yield of 90 per cent of the theoretical quantity. The residue was leached with water to remove salt and the remaining 430 lbs. of crude barium sulphate were reduced with 60 lbs. of anthracite coal in an electric tube furnace at a white heat to produce 332 lbs. of 85 per cent barium sulphide.

*Example II*

1,000 lbs of 20 per cent acetic acid were neutralized with 255 lbs. crude barium oxide. The solution obtained was evaporated by boiling and the residual acetate dried at 160° C. The dry acetate was mixed for six hours while cooling with 323 lbs. of anhydrous acetic acid and 235 lbs. sodium chlorsulphonate. From the resulting mixture was distilled off under vacuum 310 lbs. of acetic acid and 153 lbs. of acetic anhydride. The residue was leached to remove the sodium chloride and the remaining 430 lbs. of crude barium sulphate were dried and ignited in an electric furnace to regenerate 250 lbs. of crude barium oxide and 140 lbs. of sulphur trioxide. The sulphur trioxide evolved together with 10 lbs. sulphur trioxide from another source to make the inevitable losses were reacted with 107 lbs. of salt to regenerate the sodium chlorsulphonate used. This reaction was conducted in a water-cooled mixing machine.

It will therefore be seen that the only waste products of our process are the $CO_2$ of Equations 2 or 7 and the $H_2O$ Equations 4 or 8, which originally cost practically nothing and have no commercial value. The only raw materials to be supplied are therefore carbon and acetic acid. The acetic acid used in Equations 3 and 8 need not be glacial but may be ordinary commercial or dilute acetic acid. Our process is therefore completely cyclic in respect of the barium, sulphur and chlorine used, except for trifling losses in the form of dust, etc.

While it would be theoretically possible to recycle the sodium sulphate of the prior art, to the best of our belief this has never been done or proposed; moreover, the economics of doing so would not be comparable with those of our process for the following reasons: sodium sulphate fuses at 884° C. and must be fused before it can be converted to the sulphide or oxide. This reaction is therefore one of considerable difficulty, requiring very special apparatus. Barium sulphate, on the other hand, can be very easily converted in commercial apparatus of well-known type.

In our process as described we are therefore enabled to recycle our by-products because of our use of barium acetate in place of the sodium acetate of the prior art.

By the substitution of barium acetate for sodium acetate we have accomplished the following highly useful results:

(a) We have facilitated dehydration of the acetate.
(b) We have facilitated separation of the sulphate from the chloride.
(c) We have made practicable the re-cycling of the sulphate, and consequently of the chloride, reduced the waste products to water and a gas of negligible value (thereby eliminating the disposal problem) and limited to the raw materials to fuel and the essential chemical involved in the reaction, namely acetic acid.

The choice of a metal from which to make up the acetate for our process involves the following considerations: (a) its acetate must be readily dehydratable without decomposition; (b) its sulphate should preferably be insoluble; (c) its sulphate must be readily convertible to the sulphide or oxide; and (d) either its sulphide or its oxide must react readily with acetic acid, preferably dilute. While we have described our process as carried out with barium acetate, we do not wish to be limited thereto, as certain other meals, such as zinc and manganese, possess the requisite properties to a greater or less degree.

The choice of a metal from which to make up the chlorsulphonate for our process involves the following considerations: (a) its chloride must be readily dehydratable and (b) its chloride must take up $SO_3$ readily to form the chlorsulphonate. We have shown that sodium chlorsulphonate is quite suitable for our process. So far as we know at present, the chlorsulphonates of ammonium, potassium, magnesium, calcium and other bases are all theoretically possible and suitable to a greater or less degree. As the properties which render practicable the recycling of the by-products in our process are inherent in the acetate rather than in the chlorsulphonate, we do not wish to be limited to any particular chlorsulphonate. However, for the reasons given, we prefer the chlorsulphonates of sodium and potassium.

Although we have used the acetate for purpose of illustration, we do not wish to be limited thereto, as other unsubstituted carboxylic acids, such as benzoic, caproic, butyric, propionic acids, etc., are within the scope of our invention.

This application is a continuation in part of our application Serial No. 154,631 filed July 20, 1937.

We claim as our invention:

1. The process for production of anhydrides of unsubstituted monobasic carboxylic acids from the aqueous carboxylic acid which comprises preparing by reaction with said acid a carboxylate of the group consisting of the corresponding carboxylates of barium and zinc, dehydrating said carboxylate and reacting the dehydrated carboxylate with a chlorsulphonate of the group consisting of the inorganic chlorsulphonates which in solution form alkaline cations.

2. The process for production of anhydrides of unsubstituted monobasic carboxylic acids, from the aqueous acid, which comprises reacting the acid with a binary compound, reactive therewith, formed by decomposition of a sulphate of the group consisting of the sulphates of barium and zinc, dehydrating the resulting carboxylate and reacting the dehydrated carboxylate with a chlorsulphonate of the group consisting of the inorganic chlorsulphonates which in solution form alkaline cations.

3. The process for production of anhydrides of unsubstituted monobasic carboxylic acids, from the aqueous carboxylic acid, which comprises reacting said acid with barium oxide, dehydrating the resulting carboxylate and reacting the dehydrated carboxylate with a chlorsulphonate of the group consisting of the inorganic chlorsulphonates which in solution form alkaline cations.

4. The process for production of anhydrides of unsubstituted monobasic carboxylic acids, from the aqueous carboxylic acid, which comprises reacting said acid with barium monosulphide, dehydrating the resulting carboxylate and reacting the dehydrated carboxylate with a chlorsulphonate of the group consisting of the inorganic chlorsulphonates which in solution form alkaline cations.

5. The process for production of anhydrides of unsubstituted monobasic carboxylic acids from the aqueous carboxylic acid which comprises reacting said acid with zinc oxide, dehydrating the resulting carboxylate and reacting the dehydrated carboxylate with a chlorsulphonate of the group consisting of the inorganic chlorsulphonates which in solution form alkaline cations.

6. The process for production of acetic anhydride from aqueous acetic acid which comprises reacting said acid with a binary compound, reactive therewith, formed by decomposition of a sulphate of the group consisting of the sulphates of barium and zinc, dehydrating the resulting acetate and reacting the dehydrated acetate with a chlorsulphonate of the group consisting of the inorganic chlorsulphonates which in solution form alkaline cations.

7. The process for production of acetic anhydride from aqueous actic acid which comprises reacting said acid with barium oxide, dehydrating the resulting acetate and reacting the dehydrated acetate with a chlorsulphonate of the group consisting of the inorganic chlorsulphonates which in solution form alkaline cations.

8. The process for production of acetic anhydride from aqueous acetic acid which comprises reacting said acid with barium monosulphide, dehydrating the resulting acetate and reacting the dehydrated acetate with a chlorsulphonate of the group consisting of the inorganic chlorsulphonates which in solution form alkaline cations.

9. The process for production of acetic anhydride from aqueous acetic acid which comprises reacting said acid with zinc oxide, dehydrating the resulting acetate and reacting the dehydrated acetate with a chlorsulphonate of the group consisting of the inorganic chlorsulphonates which in solution form alkaline cations.

10. The process for production of acetic anhydride from aqueous acetic acid which comprises reacting said acid with barium oxide to produce barium acetate, heating said acetate to substantially 160° C. and reacting the resulting dehydrated acetate with a chlorsulphonate of the group consisting of the inorganic chlorsulphonates which in solution form alkaline cations.

11. The process for production of acetic anhydride from aqueous acetic acid which comprises reacting said acid with barium monosulphide to produce barium acetate, heating said acetate to substantially 160° C. and reacting the resulting dehydrated acetate with a chlorsulphonate of the group consisting of the inorganic chlorsulphonates which in solution form alkaline cations.

12. The process for production of anhydrides of unsubstituted monobasic carboxylic acids from the aqueous carboxylic acid which comprises reacting said acid with barium monosulphide, dehydrating the resulting carboxylate, oxidizing the resulting hydrogen sulphide to sulphur trioxide, reacting said sulphur trioxide with an anhydrous chloride of the group consisting of the inorganic chlorides forming therewith chlorsulphonates which in solution form alkaline cations and reacting the resulting chlorsulphonate with said dehydrated carboxylate.

13. The process for production of acetic anhydride from aqueous acetic acid which comprises reacting said acid with barium sulphide, dehydrating the resulting acetate, oxidizing the resulting hydrogen monosulphide to sulphur trioxide, reacting said sulphur trioxide with an anhydrous chloride of the group consisting of the inorganic chlorides forming therewith chlorsulphonates which in solution form alkaline cations and reacting the resulting chlorsulphonate with said dehydrated acetate.

AYLMER H. MAUDE.
SIDNEY G. OSBORNE.